US011659901B2

(12) United States Patent
Kim

(10) Patent No.: US 11,659,901 B2
(45) Date of Patent: May 30, 2023

(54) RING WITH ROTATION AND LOCK FUNCTION TO DISPLAY MULTIPLE ANNIVERSARIES

(71) Applicant: Young Gil Kim, Seoul (KR)

(72) Inventor: Young Gil Kim, Seoul (KR)

( * ) Notice: Subject to any disclaimer, the term of this patent is extended or adjusted under 35 U.S.C. 154(b) by 163 days.

(21) Appl. No.: 17/327,902

(22) Filed: May 24, 2021

(65) Prior Publication Data

US 2021/0378369 A1 Dec. 9, 2021

(30) Foreign Application Priority Data

Jun. 8, 2020 (KR) .................. 10-2020-0069275

(51) Int. Cl.
*A44C 9/00* (2006.01)

(52) U.S. Cl.
CPC .................. *A44C 9/003* (2013.01)

(58) Field of Classification Search
CPC ..... A44C 9/003; A44C 5/0015; A44C 9/0053; G09D 3/06; G09D 3/08; G09D 3/10
USPC ........................................................ 63/15
See application file for complete search history.

(56) References Cited

U.S. PATENT DOCUMENTS

| 2,048,878 | A | * | 7/1936 | Moldenhauer | ......... A44C 9/003 |
| | | | | | 63/15 |
| 2,060,345 | A | * | 11/1936 | Phillips | ................ A44C 5/0092 |
| | | | | | 63/3 |
| 2,812,604 | A | * | 11/1957 | Nelson | ................. A44C 9/0053 |
| | | | | | 63/15.3 |
| 2014/0265114 | A1 | | 9/2014 | Laniewicz | |

FOREIGN PATENT DOCUMENTS

KR   20-2000-0010596 U   6/2000
KR      10-1718369 B1    3/2017

* cited by examiner

*Primary Examiner* — Jack W Lavinder
(74) *Attorney, Agent, or Firm* — KORUS Patent, LLC; Seong Il Jeong

(57) ABSTRACT

A ring with a rotation and a lock function to display multiple anniversaries, the ring comprising: a main ring including engagement areas and distant areas between the engagement areas; a sub ring rotatably engaged with the main ring, and engagement members positioned between the main ring and the sub ring, wherein the subring includes a receiver receiving the engagement member and including a first to fourth side with an opening area; wherein a length of the opening area is shorter than that of the first side; wherein the engagement member is made of elastic materials and positioned in the receiver; wherein when the opening area is aligned with the engagement groove area, the engagement member is protruded from the receiver and engaged with the engagement groove; wherein when the opening area is aligned with the distant area, the engagement member is inserted in the receiver.

7 Claims, 7 Drawing Sheets

RING WITH ROTATION AND LOCK FUNCTION TO DISPLAY MULTIPLE ANNIVERSARIES

TECHNICAL FIELD

The invention relates to a ring with a rotation and a lock function to display multiple anniversaries and more particularly, a ring comprising a sub ring that can stably rotate and be fixed to display multiple anniversaries.

BACKGROUND ART

Generally, a ring is an accessory that people can express their individualities according to surroundings, atmospheres, and psychological situations. The ring is used by putting it on the finger of a user.

Recently, people with various personalities tend to choose accessories as means to express their own unique individualities. According to requests of the public, it is required that the design of rings be changed according to fads or the tastes of young generation, who want unique appearances different from others.

There are problems that the conventional rings whose designs, jewels, decorations, or patterns fixed to the ring body are difficult to respond to rapid changes in fads or public demands as well as have limitations to satisfy the demands of the young generation.

Especially, as demands for displaying anniversary on rings have been increased, rings with a rotation and a lock function have been appeared. However, as multiple fixing members are added to rings to fix the rotation and the lock element stably, the sizes of the rings are increased, which hinders the rings from performing a role as an accessory.

DISCLOSURE

Technical Problem

Accordingly, one object of the present invention is to provide a ring that enables a subring to stably rotate and be fixed to display multiple anniversaries.

The object of the present invention is not limited to the objects mentioned above. It would be apparent that other objects of the invention, which are not mentioned above, can be understood by one skilled in this technical field.

Technical Solution

A ring with a rotation and a lock function to display multiple anniversaries according to one embodiment of the invention to solve the problems is configured to comprise: a main ring including engagement areas that engagement grooves are positioned on and distant areas positioned between the engagement areas; a sub ring engaged with the main ring in a rotatable and fixable way, and engagement members positioned between the main ring and the sub ring, wherein the subring includes a receiver that receives the engagement member; wherein the receiver includes a first side, a second side facing the first side and connected to an opening area, a third and a fourth side respectively connecting between the first and the second side; wherein a length of the opening area in a first direction is shorter than a length of the first side in the first direction; wherein the engagement member is made of materials having elasticity and positioned in the receiver; wherein when the opening area is aligned with the engagement groove area, a portion of the engagement member is protruded from the receiver outwardly and engaged with the engagement groove; wherein when the opening area is aligned with the distant area, the portion of the engagement member is inserted in the receiver.

The main ring includes: a first part extended in the first direction, a third part spaced apart from the first part in a second direction intersecting the first direction, a fifth part spaced part from the first part in an opposite direction to the second direction, a second part connecting between the first and the third part, and a fourth part connecting between the first and the fifth part.

Each of lengths of the first, the third, and the fifth part in the first direction is longer than each of lengths of the second and the fourth part in the first direction, wherein a first main ring groove is defined by length differences formed by the first, the second, and the third part, and a second main ring groove is defined by length differences formed by the first, the fourth, and the fifth part.

The engagement grooves are positioned on the second and the fourth part, and the engagement grooves are extended in the second direction.

Each of thicknesses of the first, the third, and the fifth part in the second direction is thinner than each of thicknesses of the second and the fourth part in the second direction, wherein the thickness of the first part in the second direction is thicker than each of the thicknesses of the second and the fourth part in the second direction.

The first and the second part are configured to be combinable to and separable from each other, and the second and the third part are formed as one body, wherein the first and the fourth part are configured to be combinable to and separable from each other, and the fourth and the fifth part are formed as one body, wherein the subring includes a first and a second subring that are spaced apart from each other, and the first subring is engaged with the second part, and the second subring is engaged with the fourth part.

The ring with a rotation and a lock function to display multiple anniversaries further comprises: an insertion groove positioned on the first part of the main ring; a first display positioned on an outer circumference surface of the first subring, and a second display positioned on an outer circumference surface of the second subring, the first display includes numbers from 1 to 12 that are engraved in intaglio, and the second display includes numbers from 1 to 31 that are engraved in intaglio.

Detailed elements and/or component of other embodiments are included in the description and drawing.

Advantageous Effects

According to one embodiment of a ring with a rotation and a lock function to display multiple anniversaries, the ring comprises engagement members with elasticity that can enable a subring to rotate and be fixed stably. In addition, the arrangement of the engagement members minimizes friction occurred by rotations, which enables a rotation and a lock function to be maintained.

In addition, the arrangement of the engagement members enables the rotation and the lock function to perform stably without an increase of the ring size.

The technical effects of the embodiments are not limited to the mentioned above. More various effects may be included in the description.

MODE FOR INVENTION

Hereinafter, the advantages, characteristics, and means to achieve those of the present invention will be described in detail with embodiments in conjunction with the accompanying drawings. However, the present invention is not limited to the embodiments disclosed below and can be embodied as various types. The embodiments are provided to be illustrative of the present invention to one skilled in the art. The present invention is defined by the scope of the appended claims.

When an element or a layer is disposed "on" other elements or layers, it includes the structures that the element or layer is disposed right above the other element and there is a third element disposed between the element and the other element. The same referral number indicate the same element over the description.

Although expressions such as "first" and "second" are used to describe various elements, these elements are not limited by these expressions. The above elements are used merely for the purpose of distinguishing an element from the other elements. Accordingly, a first element may be referred to as a second element, and likewise a second element may also be referred to as a first element, without departing from the scope of embodiments of the present disclosure.

Hereinafter, specific embodiments will be described in conjunction with the accompanying drawings.

Figure 1:
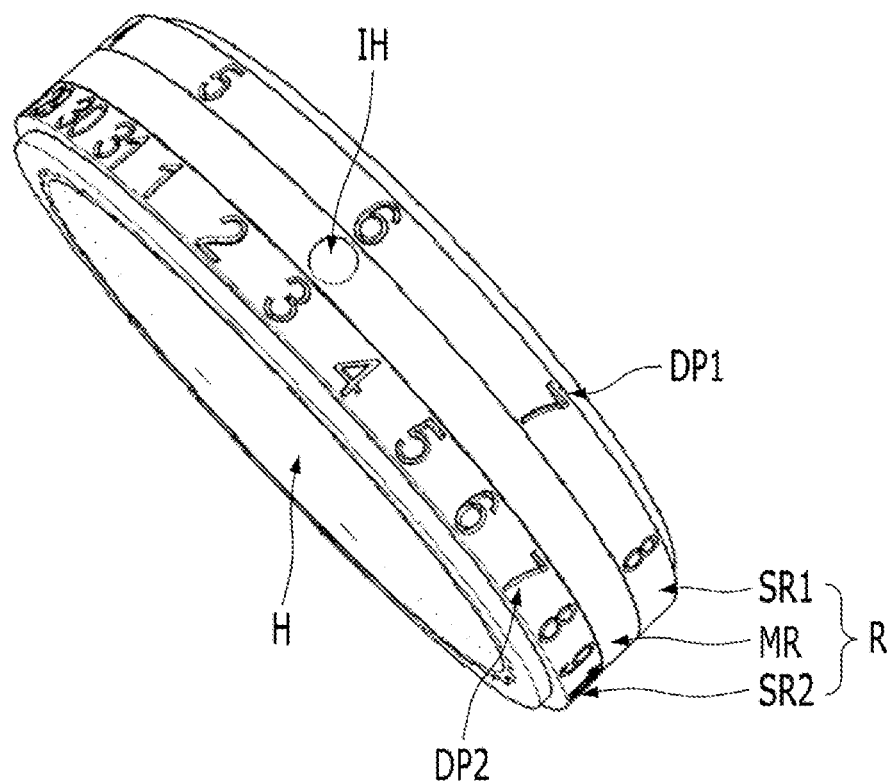
FIG. 1 is a perspective view schematically showing a ring with a rotation and a lock function to display multiple anniversaries according to one embodiment of the present invention.
Figure 2:
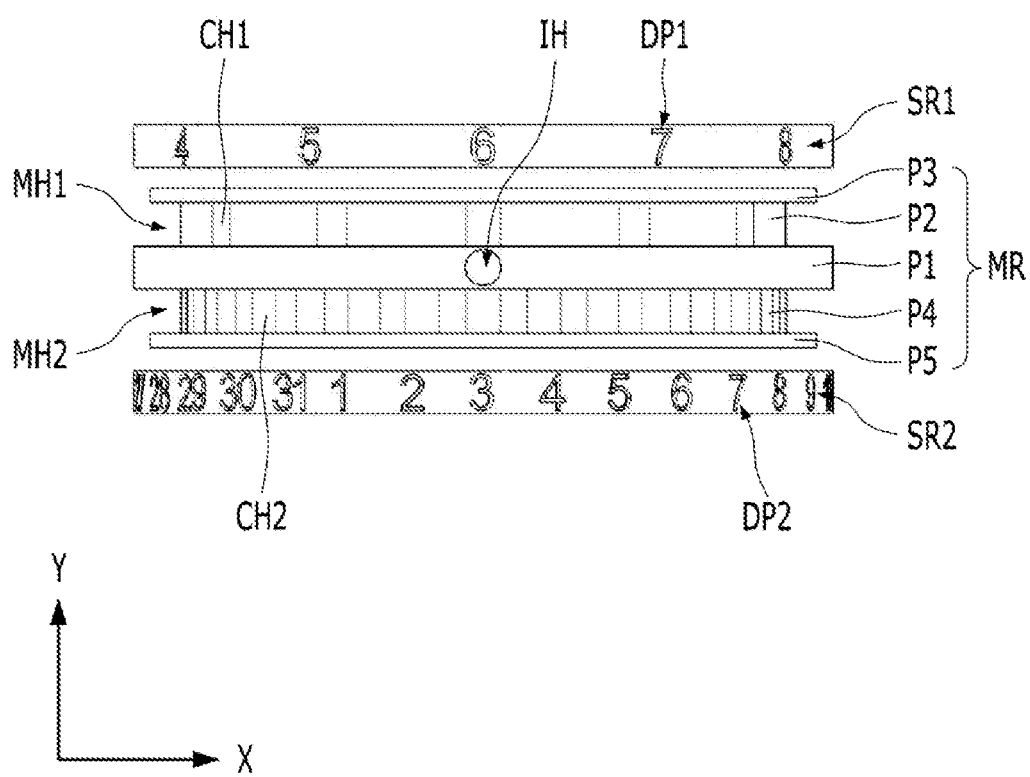
FIG. 2 is an exploded view schematically showing a ring with a rotation and a lock function to display multiple anniversaries according to one embodiment of the present invention.
Figure 3:
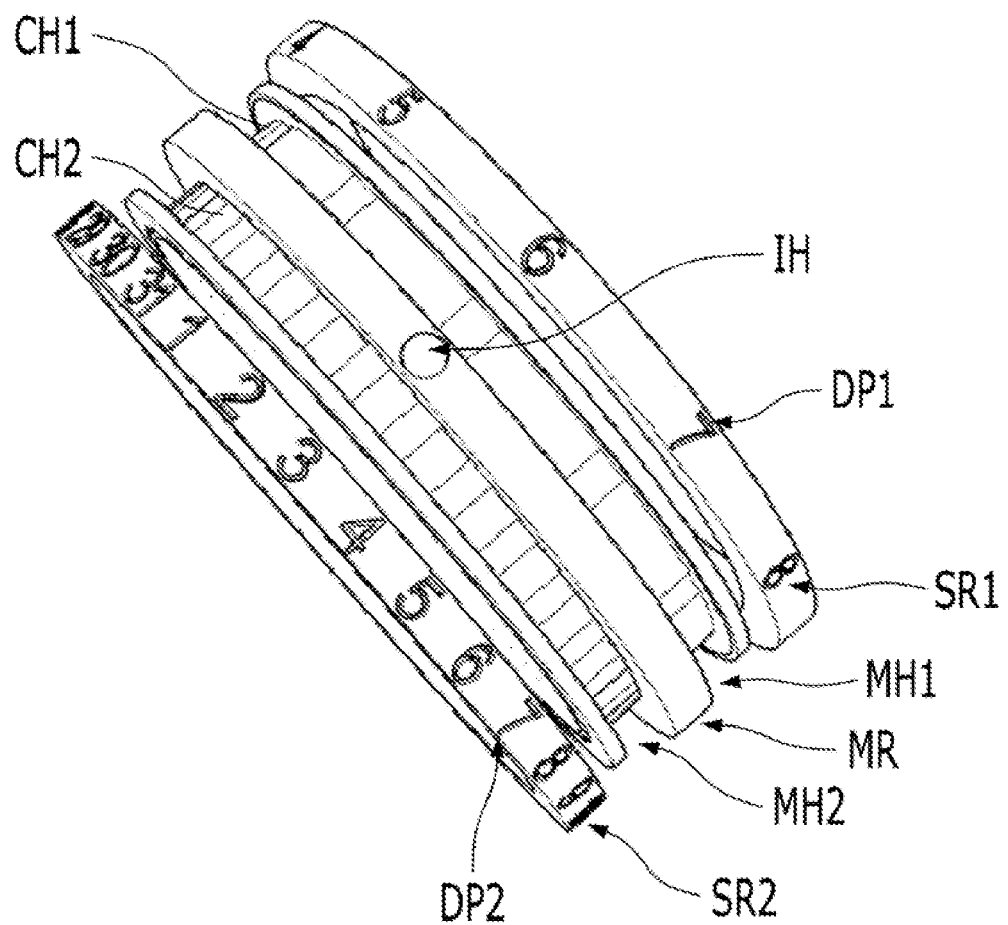
FIG. 3 is an exploded view schematically showing a ring with a rotation and a lock function to display multiple anniversaries according to one embodiment of the present invention.
Figure 4:
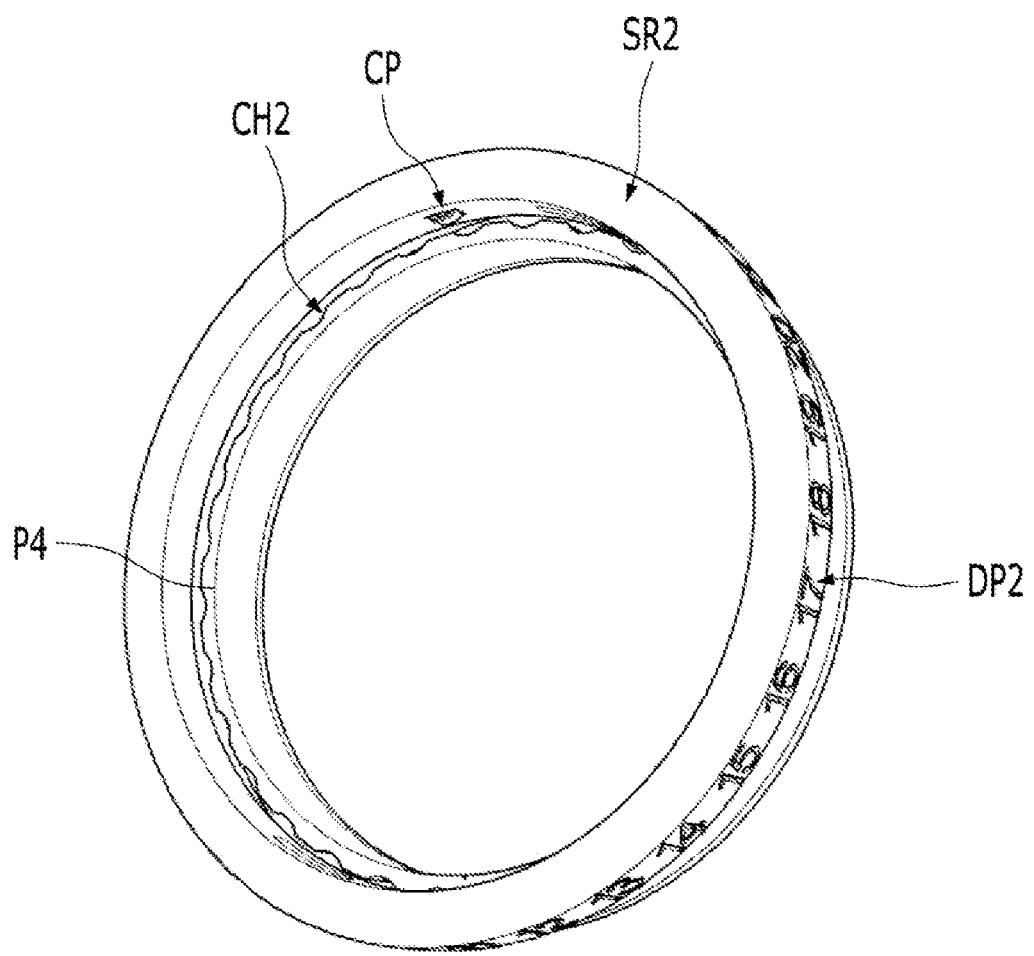
FIG. 4 is a drawing schematically showing an engagement member and an engagement groove of a ring with a rotation and a lock function to display multiple anniversaries according to one embodiment of the present invention.
Figure 5:
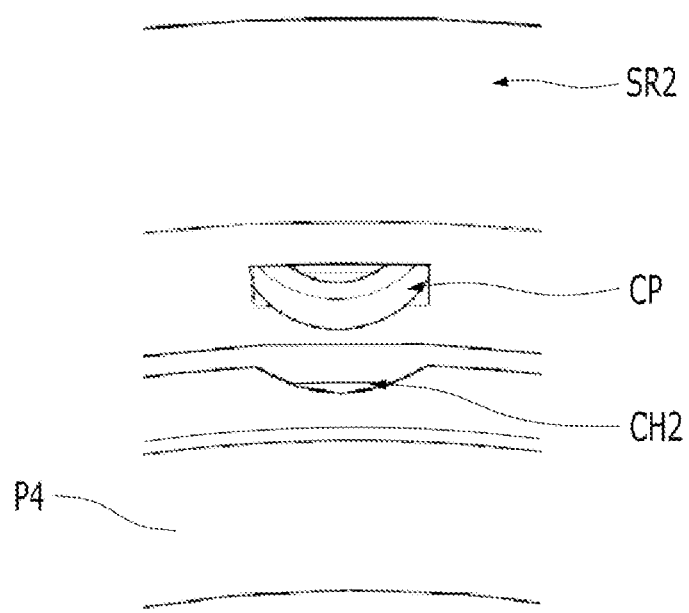
FIG. 5 is a magnified view of schematically showing the engagement member and the engagement groove of FIG. 4.
Figure 6:
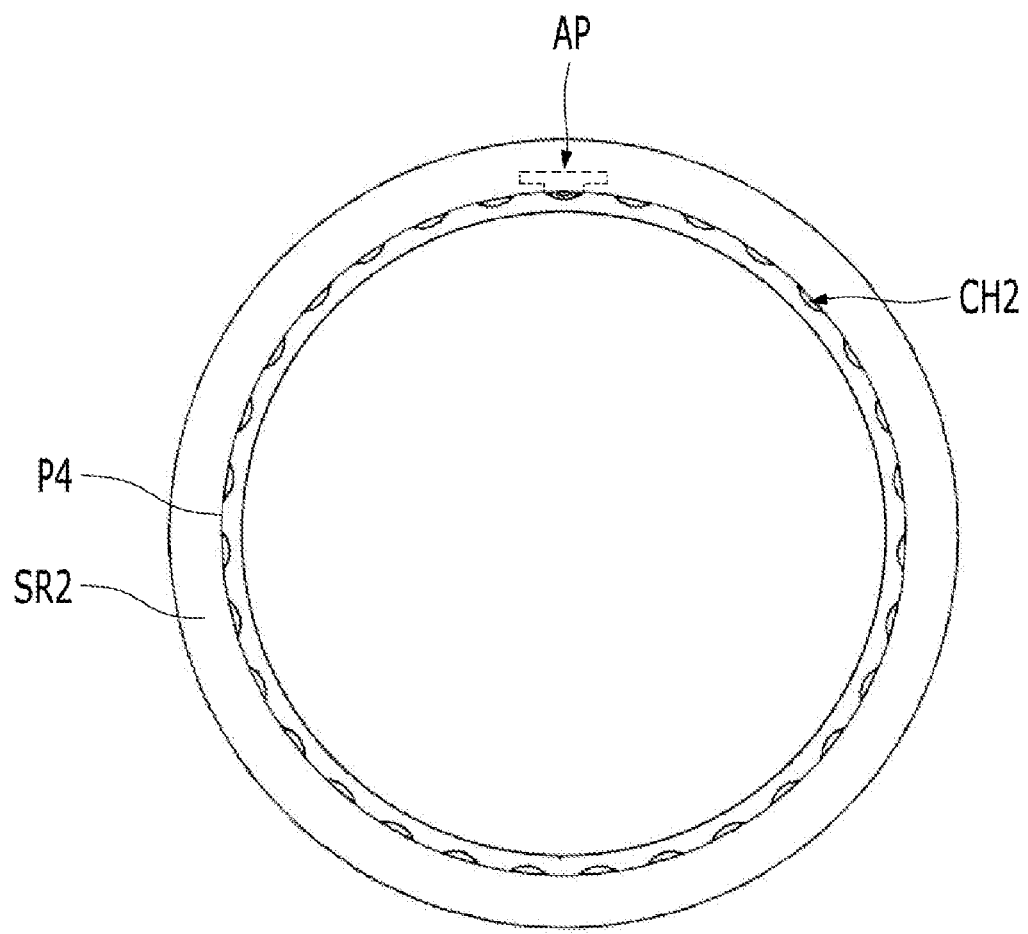
FIG. 6 is a drawing schematically showing an arrangement of a receiver of a ring with a rotation and a lock function to display multiple anniversaries according to one embodiment of the present invention.
Figure 7:
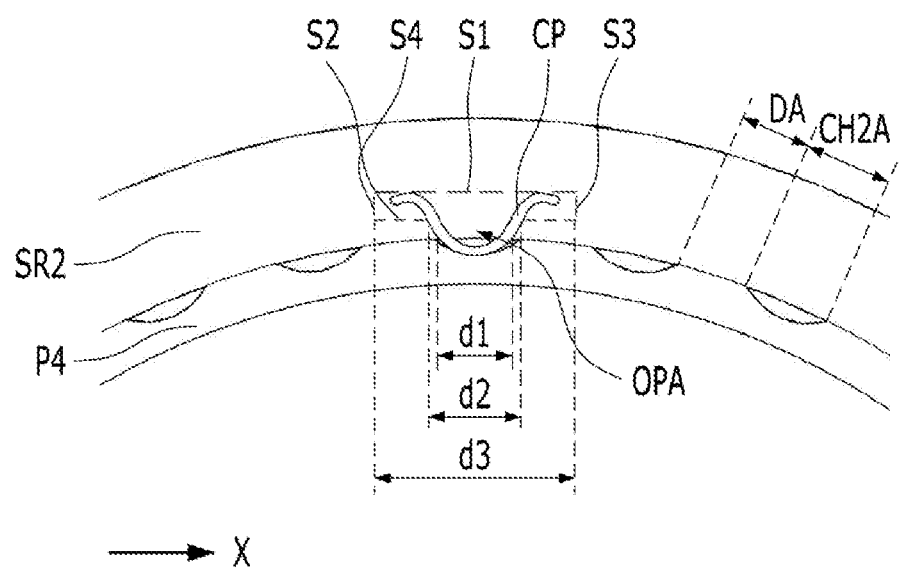
FIG. 7 is a drawing schematically showing an engagement member positioned in a receiver of a ring with a rotation and a lock function to display multiple anniversaries according to one embodiment of the present invention.

FIG. 1 is a perspective view schematically showing a ring with a rotation and a lock function to display multiple anniversaries according to one embodiment of the present invention. FIG. 2 is an exploded view schematically showing a ring with a rotation and a lock function to display multiple anniversaries according to one embodiment of the present invention. FIG. 3 is an exploded view schematically showing a ring with a rotation and a lock function to display multiple anniversaries according to one embodiment of the present invention. FIG. 4 is a drawing schematically showing an engagement member and an engagement groove of a ring with a rotation and a lock function to display multiple anniversaries according to one embodiment of the present invention. FIG. 5 is a magnified view of schematically showing the engagement member and the engagement groove of FIG. 4. FIG. 6 is a drawing schematically showing an arrangement of a receiver of a ring with a rotation and a lock function to display multiple anniversaries according to one embodiment of the present invention. FIG. 7 is a drawing schematically showing an engagement member positioned in a receiver of a ring with a rotation and a lock function to display multiple anniversaries according to one embodiment of the present invention.

Referring to FIG. 1, a ring R with a rotation and a lock function to display multiple anniversaries according to one embodiment comprises a main ring MR, a first and a second subring SR1, SR2 engaged with the main ring in a rotatable and fixable way.

The first and the second subring SR1, SR2 can independently rotate and be fixed while they are engaged with the main ring MR. In drawings, although the first and second subring SR1, SR2 are engaged with the main ring MR, respectively, this is merely one embodiment of the present invention. In some embodiments, only one of the first and the second subring SR1, SR2 may be engaged with the main ring MR, or an additional subring other than the first and the second subring SR1, SR2 may be engaged with the main ring MR as well.

In some embodiments, the main ring MR may comprise an insertion groove IH in an area where the first and the second subring SR1, SR2 are not engaged.

In the insertion groove IH, various jewels, ornaments, or decorations may be attached. In drawings, the ring R comprises the single insertion groove IH but is not limited to. The ring R may comprise a plurality of the insertion grooves IH.

Additionally, although the insertion groove IH is illustrated to have a circle shape in drawings, this is merely one embodiment of the present invention. In some embodiments, the insertion groove IH may have various shapes such an oval shape, a polygon shape, and so on.

A first display DP1 may be arranged on an outer circumference surface of the first subring SR1. In the first display DP1, any external designs that a user wants to display, such as numbers, symbols, characters, figures, and so on, may be displayed. For example, as illustrated in FIG. 1, the first display DP1 may display a twelvemonth from January to December as numbers from 1 to 12. In this instance, the first subring SR1 can be controlled to rotate until a desired number among numbers from 1 to 12 is aligned to the insertion groove IH, and then, the desired number can be fixed at that position. Being fixed means a lock function where the desired number can be locked up.

In some embodiments, number from 1 to 12 referring to a twelvemonth from January to December may be engraved on the outer circumference surface of the first display DP1. For example, as illustrated in FIG. 1, numbers from 1 to 12 may be engraved on the outer circumference surface of the first display DP1 in intaglio. However, the present invention is not limited to this embodiment. In some embodiments, numbers from 1 to 12 may be engraved on the outer circumference surface of the first display DP1 in a raised carving. In other embodiments, numbers from 1 to 12 may be printed on the outer circumference surface of the first display DP1.

In addition, in some embodiments, the first display DP1 may be a flexible display panel. For example, the first display DP1 may be a flexible OLED panel, a flexible LED panel, and so on. In this instance, any external designs that a user wants to display, such as numbers, symbols, characters, figures, and so on, may be displayed through an operation of the flexible display panel.

A second display DP2 may be arranged on an outer circumference surface of the second subring SR2. In the second display DP2, any external designs that a user wants to display, such as numbers, symbols, characters, figures, and so on, may be displayed. For example, as illustrated in FIG. 1, the second display DP2 may display days of a month from 1st to 31st as numbers from 1 to 31. In this instance, the second subring SR2 can be controlled to rotate until a desired number among numbers from 1 to 31 is aligned to the insertion groove IH, and then, the desired number can be fixed at that position.

In addition, in some embodiments, the second display DP2 may be a flexible display panel. For example, the second display DP2 may be a flexible OLED panel, a flexible LED panel, and so on. In this instance, any external designs that a user wants to display, such as numbers, symbols, characters, figures, and so on, may be displayed through an operation of the flexible display panel.

A ring comprising the main ring MR, the first and the second subring SR1, SR2 engaged with the main ring MR in a rotatable and fixable way includes a hole H through which a user's finger is inserted. The main ring MR, the first and the second subring SR1, SR2 may be made of metal materials but is not limited to. The first and the second subring SR1, SR2 may be made of various materials such as ceramic, plastic, and so on. The first and the second subring SR1, SR2 may be made of different materials from each other.

Referring to FIGS. 2 and 3, the main ring MR may comprise a first part P1 extended in a first direction (X-axis direction), a third part P3 spaced apart from the first part P1 in a second direction (Y-axis direction) intersecting the first direction (X-axis direction), a fifth part P5 spaced part from the first part P1 in an opposite direction to the second direction (Y-axis direction), a second part P2 connecting between the first and the third part P1, P3, and a fourth part P4 connecting between the first and the fifth part P1, P5.

In some embodiments, in the first direction (X-axis direction), each of lengths of the first, the third, and the fifth part P1, P3, P5 may be longer than each of lengths of the second and the fourth part P2, P4.

In some embodiments, in the second direction (Y-axis direction), each of thicknesses of the first, the third, and the fifth part P1, P3, P5 may be thinner than each of thicknesses of the second and the fourth part P2, P4.

In some embodiments, in the second direction (Y-axis direction), a thickness of the first part P1 may be thicker than each of thicknesses of the second and the fourth part P2, P4.

In some embodiments, the first and the second part P1, P2 may be configured to be combinable to and separable from each other to be engaged with the first subring SR1, and the second and the third part P2, P3 may be formed as one body. In some embodiments, the first and the fourth part P1, P4 may be configured to be combinable to and separable from each other to be engaged with the second subring SR2, and the fourth and the fifth part P4, P5 may be formed as one body. However, the present invention is not limited to embodiments mentioned above, each of the first, the second, the third, the fourth, and the fifth part P1, P2, P3, P4, P5 may be combinable to and separable from each other.

In addition, in some embodiments, the first, the second, and the fourth P1, P2, P4 may be combinable to and separable from each other.

As mentioned above, since each of lengths of the first, the third, and the fifth part P1, P3, P5 in the first direction (X-axis direction) is longer than each of lengths of the second and the fourth part P2, P4 in the first direction, step portions by length differences are formed in the second and the fourth part P2, P4 of the main ring MR. For example, a step portion by the first, the second, and the third part P1, P2, P3 may form a first main ring groove MH1, and a step portion by the first, the fourth, and the fifth part P1, P4, P5 may form a second main ring groove MH2. In this instance, the first subring SR1 may be positioned in the first main ring groove MH1, and the second subring SR2 may be positioned in the second main ring groove MH2.

In some embodiments, first engagement grooves CH1 may be positioned on an outer circumference surface of the second part P2. For example, in case the numbers 1 to 12 referring to the twelvemonth are displayed in the first display DP1, the first engagement grooves CH1 corresponding to the numbers 1 to 12 may be respectively positioned on the outer circumference surface of the second part P2. As illustrated in FIG. 2, each of a plurality of the first engagement grooves CH1 may be extended in the second direction (Y-axis direction) and spaced apart from each other in the first direction (X-axis direction).

In some embodiments, a second engagement groove CH2 may be positioned on an outer circumference surface of the fourth part P4. For example, in case the numbers 1 to 31 referring to 31 days are displayed in the second display DP2, the second engagement grooves CH2 corresponding to the numbers 1 to 31 may be respectively positioned on the outer circumference surface of the fourth part P4. As illustrated in FIG. 2, each of a plurality of the second engagement grooves CH2 may be extended in the second direction (Y-axis direction) and spaced apart from each other in the first direction (X-axis direction).

As described above, in the first part P1, the insertion groove IH may be positioned.

Referring to FIGS. 4 to 7, in some embodiments, a cross section of the second engagement groove CH2 may have a round shape. Likewise, a cross section of the first engagement groove CH1 may have a round shape (not shown).

Hereafter, engagement structures between the main ring MR and the first subring SR1 and between the main ring MR and the second subring SR2 will be explained. The engagement structure between the main ring MR and the second subring SR2 will be described in detail for an example. The engagement structure between the main ring MR and the first subring SR1 is the same as that between the main ring MR and the second subring SR2.

In some embodiments, the engagement member CP may be positioned between the second subring SR2 and the main ring MR.

In the second subring SR2, in case the outer circumference surface of the second subring SR2, where the second display DP2, is displayed is a first surface, the engagement member CP may be positioned in a second surface, which is an opposite surface to the first surface.

The second subring SR2 comprises a receiver AP that can receive the engagement member CP, and the engagement member CP may be sit on the receiver AP.

In some embodiments, the engagement members CP may be plural, and the receiver AP also may be plural corresponding to a plurality of the engagement members CP.

In some embodiments, the receiver AP may be communicated with an opening area OPA which is opened toward the second surface of the second subring SR2. Specifically, the receiver AP may comprise a first side S1, a second side S2 facing with the first side S1 and connected to the opening area OPA, a third and a fourth side S3, S4 connecting between the first and the second side S1, S2. A length d2 of the opening area OPA in the first direction (X-axis direction) may be shorter than a length d3 of the first side S1 in the first direction (X-axis direction). Thus, an area of the receiver AP may be formed to be bigger than an area of the opening area OPA.

A length of the engagement member CP in the first direction (X-axis direction) is longer than a length d3 of the first side S1 in the first direction (X-axis direction). In addition, the engagement member CP may be made of materials with elasticity. In some embodiments, the engagement member CP may be made of metal materials.

Accordingly, in case the engagement member CP is inserted in and fixed to the receiver AP, by the elasticity of the engagement member CP and the length difference between the engagement member CP and the receiver AP, a portion of the engagement member CP can pass through the opening area OPA and be outwardly protruded from the second surface of the second subring SR2.

A length d1 of the engagement member CP that is protruded from the second surface of the second subring SR2 outwardly in the first direction (X-axis direction) may be shorter than a length d2 of the opening area OPA in the first direction (X-axis direction).

Accordingly, a portion of the engagement member CP, which is protruded from the second surface of the second subring SR2 outwardly, has a round shape due to its elasticity, thereby being inserted into the second engagement groove CH2. Thus, the second subring SR2 can be fixed to the main ring MR.

Specifically, the outer circumference surface of the fourth part P4 of the main ring MR may comprise second engagement groove areas CH2A, where the second engagement grooves CH2 are positioned, and distant areas DA between the second engagement grooves CH2, where the second engagement grooves CH2 are not positioned.

When the opening area OPA and the second engagement groove areas CH2A are aligned to each other, a portion of the engagement member CP may be protruded from the second surface of the second subring SR2 outwardly through the opening area OPA and be inserted into the second engagement groove CH2. In other words, the engagement member CP may meet with the first and the second side S1, S2 of the receiver AP, and the second engagement groove CH2, and not meet with the third and the fourth side S3, S4 of the receiver AP. However, the present invention is not limited to this embodiment. In some embodiments, when the opening area OPA and the second engagement groove area CH2A are aligned to each other, the engagement member CP may meet with the first, the second, the third, fourth side S1, S2, S3, S4 of the receiver AP, and the second engagement groove CH2.

When the opening area OPA and the distant areas DA are aligned to each other, the whole engagement member CP may be positioned inside the receiver AP (This structure does not exclude a case that a minute portion of the engagement member CP is protruded from the receiver AP outwardly). Thus, the engagement member CP may meet with the first, the second, the third, the fourth side S1, S2, S3, S4, and the outer circumference of the fourth part P4 of the main ring MR, which corresponds to the distant area DA. In this instance, the engagement member CP may not meet with the second engagement groove CH2.

Accordingly, when a user rotates the second subring S2, a portion of the engagement member CP protruded outwardly from the second surface of the second subring SR2 may be being inserted inside the receiver AP through the opening area OPA, by elasticity. When the engagement member CP is moved to an area where the second engagement groove CH2 is formed, the engagement member CP is protruded outwardly from the second surface of the second subring SR2 and can be inserted into the second engagement groove CH2. Accordingly, the second subring SR2 can be stably fixed in an area where the second engagement groove CH2 is positioned.

Since the second subring SR2 includes the receiver AP with the opening area OPA, and the engagement member CP with elasticity is positioned inside the receiver AP, the second subring SR2 can stably rotate and be fixed. Since the engagement structure between the first subring SR1 and the main ring MR is the same as the engagement structure between the second subring SR2 and the main ring MR, a duplicate description is omitted.

Although embodiments of the present invention are described above, it would be apparent that many more modifications and variations than mentioned above are possible by an ordinary person skilled in the art without changing the true spirit and scope of the inventive concept. Thus, embodiments described above are to be considered illustrative and not limiting the scope of the present invention.

What is claimed is:

1. A ring with a rotation and a lock function to display multiple anniversaries, the ring comprising:
   a main ring including engagement areas that engagement grooves are positioned on and distant areas positioned between the engagement areas;
   a sub-ring engaged with the main ring in a rotatable and fixable way, and
   engagement members positioned between the main ring and the sub-ring,
   wherein the sub-ring includes a receiver that receives an engagement member;
   wherein the receiver includes a first side, a second side facing the first side and connected to an opening area, a third and a fourth side respectively connecting between the first and the second side;
   wherein a length of the opening area in a first direction is shorter than a length of the first side in the first direction;
   wherein the engagement member is made of materials having elasticity and positioned in the receiver;
   wherein when the opening area is aligned with an engagement groove area, a portion of the engagement member is protruded from the receiver outwardly and engaged with an engagement groove;
   wherein when the opening area is aligned with a distant area, the portion of the engagement member is inserted in the receiver.

2. The ring of claim 1, wherein the main ring includes:
   a first part extended in the first direction,
   a third part spaced apart from the first part in a second direction intersecting the first direction,
   a fifth part spaced apart from the first part in an opposite direction to the second direction,
   a second part connecting between the first and the third part, and
   a fourth part connecting between the first and the fifth part.

3. The ring of claim 2, wherein each of lengths of the first, the third, and the fifth part in the first direction is longer than each of lengths of the second and the fourth part in the first direction,
  wherein a first main ring groove is defined by length differences formed by the first, the second, and the third part, and a second main ring groove is defined by length differences formed by the first, the fourth, and the fifth part.

4. The ring of claim 3, wherein the engagement grooves are positioned on the second and the fourth part, and the engagement grooves are extended in the second direction.

5. The ring of claim 4, wherein each of thicknesses of the first, the third, and the fifth part in the second direction is thinner than each of thicknesses of the second and the fourth part in the second direction,
  wherein the thickness of the first part in the second direction is thicker than each of the thicknesses of the second and the fourth part in the second direction.

6. The ring of claim 5, wherein the second and the third part are formed as one body,
  wherein the fourth and the fifth part are formed as one body,
  wherein the sub-ring includes a first and a second sub-ring that are spaced apart from each other, and the first sub-ring is engaged with the second part, and the second sub-ring is engaged with the fourth part.

7. The ring of claim 6, further comprising:
  an insertion groove positioned on the first part of the main ring;
  a first display positioned on an outer circumference surface of the first sub-ring, and
  a second display positioned on an outer circumference surface of the second sub-ring,
  the first display includes numbers from 1 to 12 that are engraved in intaglio, and the second display includes numbers from 1 to 31 that are engraved in intaglio.

* * * * *